March 22, 1966  J. GABLER  3,241,729
DISPENSERS FOR COSMETIC AND MEDICINAL PREPARATIONS
Filed Nov. 16, 1964
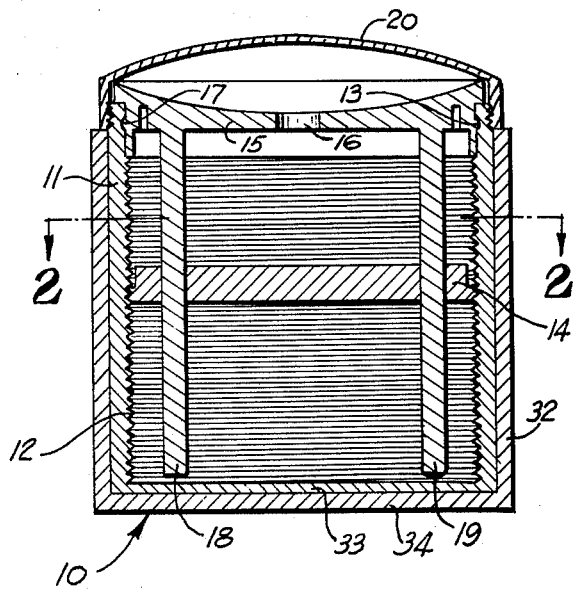
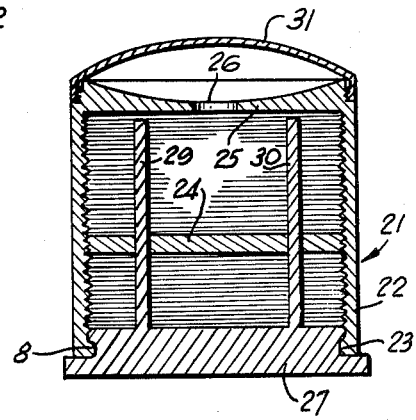
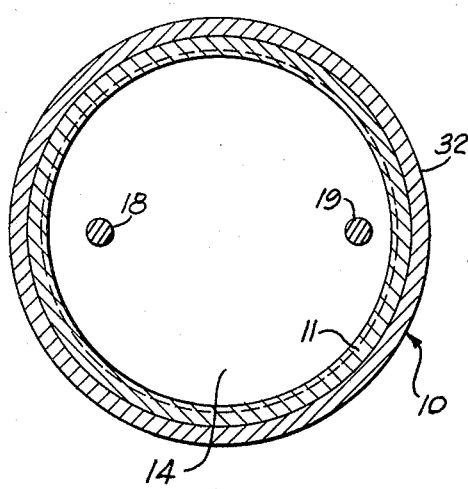
INVENTOR.
JOSEF GABLER
BY Richards & Geier
ATTORNEYS

United States Patent Office 3,241,729
Patented Mar. 22, 1966

3,241,729
DISPENSERS FOR COSMETIC AND
MEDICINAL PREPARATIONS
Josef Gabler, 44 Mainaustrasse, Zurich 8, Switzerland
Filed Nov. 16, 1964, Ser. No. 411,521
2 Claims. (Cl. 222—390)

This invention relates to dispensers used for containing and dispensing various substances, particularly cosmetic and medicinal preparations in the form of creams, pastes, gels or sticks.

Creams and pastes constituting cosmetic or medicinal preparations are usually located in round containers. The user opens the cover of the container and often removes the required amount of the preparation by scraping it off with two or three fingers of one hand. Then the preparation is applied by these same fingers to the skin of the person being treated. While this procedure may be satisfactory in the case of cosmetic creams for personal use, it most definitely is unhygienic when the cream or paste is of a medicinal nature and/or when it is being applied by operators on several persons in succession. While an operator or nurse will certainy wash his or her hands after treating each patient or customer, the washing of hands each time the cream or paste is touched in the container is obviously impossible. Thus the germs or disease carrier can be easily transmitted by the fingers from a diseased skin to the cream or paste in the container and then transferred to the next patient or customer. Furthermore, the paste in the container can be dirtied by the fingers of the user.

An object of the present invention is the provision of a sanitary dispenser which is constructed so as to eliminate this danger of infection.

A further object is the provision of a dispenser which can be conveniently combined with existing containers.

Another object of the invention is to provide a dispenser which will be convenient, effective and economical in use, which is of simple construction and can be easily manufactured.

Other objects of the present invention will become apparent in the course of the following specification.

According to one embodiment of the invention there is provided a dispenser comprising a generally cylindrical container for the substance to be dispensed, open at one end thereof and having a plunger or follower mounted therein with its periphery in screw-threaded engagement with the cylindrical wall thereof, the dispenser further comprising an element rotatably mounted in the open end of the container and formed with an aperture for the egress of the said substance, and the plunger or follower being slidable lengthwise relatively to at least one elongated guide member mounted on said rotatable element and extending lengthwise in the container so that, during relative rotation of said element and the container, the plunger or follower is rotated relatively to the container so as to be displaced in the axial direction of the container, to expel or retract said substance through said aperture.

According to another embodiment of the invention the dispenser comprises relatively rotatable opposite end portions, one of which is rigid with at least a part of the cylindrical wall of the container, the plunger or follower being slidable lengthwise relatively to at least one elongated guide member extending lengthwise in the container, the guide member being fixed relatively to the other end portion; thus, during relative rotation of the two end portions, the plunger or follower is held against rotation relatively to said other end portion but is rotated relatively to said one end portion, and to the said cylindrical wall or part thereof rigid with the latter.

In either of the above-mentioned forms of dispenser provided by the invention the, or each, guide member may be in the form of a rod passing through a hole in the plunger or follower. If two or more guide rods are provided, they may be spaced apart from one another in the transverse direction relatively to the axis of the container.

In order to effect the rotatable mounting of the rotatable element in the first-mentioned form of dispenser or of the rotatable end portion in the second form, it may be sufficient to provide simply a relatively tight push fit between the cooperating bearing surfaces. Preferably, however, means are provided to retain the relatively rotatable parts in engagement with one another and to guide them in their relative rotation. Such means may comprise a circumferential groove and an inter-fitting circumferential bead on the respective parts, the parts being snapped into engagement with one another during assembly, by virtue of the resilience of the material from which they are made.

The dispensers of the present invention may be manufactured as final units to be filled and sold by the distributor, or they can be used as inserts which can be fitted into any existing box or container. When the dispenser is used as an insert its size will be adapted to that of the container into which it is fixed so as to permit convenient handling.

The invention will appear more clearly from the following detailed description when taken in connection with the accompanying drawing showing, by way of example, preferred embodiments of the inventive idea.

In the drawing:

FIGURE 1 is a vertical section through a dispenser construction in accordance with the principles of the present invention.

FIGURE 2 is a section along the line II—II of FIG. 1.

FIGURE 3 is a vertical section through a somewhat differently constructed dispenser.

The dispenser 10 shown in FIGS. 1 and 2 includes an inner cylindrical container 11 which is closed at one end and open at the other. The internal surface of the container 11 is formed with a screw thread 12 and, immediately adjacent the open end, with a circumferential groove 13. A plunger 14 in the form of a circular disc or plate is engaged in the container and has its periphery formed with a screw thread which engages with the internal screw thread 12 of the container 11.

The inner container 11 fits into an outer container 32. The bottom 33 of the inner container 11 is glued to the bottom 34 of the outer container 32.

The container is closed by means of a closure element in the form of a disc 15 formed with a central hole 16, the peripheral surface of the disc being formed with a circumferential bead 17. The container 11 and the closure element 15 may conveniently be made from a plastic material and they will then have sufficient resilience for the closure element 15 to be snapped into position in the open end or mouth of the container 11, with the bead 17 engaging in the groove 13. The bead 17 thus retains the closure element 15 in position in the mouth of the container 11 and guides it for turning movement therein.

At its outer face the closure element 15 is recessed or dished. Its inner face is flat and has two plain cylindrical rods 18 and 19 projecting therefrom at opposite sides of the hole 16, these rods being formed integrally with the element 15 during the moulding process. The rods 18 and 19 extend lengthwise in the container 11, as far as the opposite end thereof, and are slidably engaged through holes formed in the plunger 14.

Since the closure element 15 is dished at one face only, the peripheral surface thereof is relatively deep and when it is in position in the mouth of the container 11 the part of the peripheral surface which is forward of the groove 17 projects from the mouth. This projecting part can thus be grasped with the fingers of one hand while the container 32 is held with the other hand and relative rotation can thus be effected.

During assembly of the dispenser the plunger 14 is screwed into the container 11, almost to the bottom thereof, and the space above the plunger 14 is filled with the substance to be dispensed. The closure element 15 is then snapped into position.

In use, relative rotation of the container 11 and the closure element 15 in one direction will cause the plunger 14 to be displaced towards the mouth of the container 11, thus forcing a quantity of the substance out of the container 11 through the aperture 16 in the closure element 15, so that it can be applied where required. Relative rotation in the opposite direction will cause the plunger 14 to be retracted and any excess of the substance will thus be drawn back into the container 11.

Thus the user can remove only that much of the cream or paste, which has been forced through the aperture 16 and cannot touch the cream or paste located inside the container 11 between the piston 14 and the closure element 15.

In addition to enabling the closure element 15 to be grasped with the fingers, the projecting part thereof also serves to receive the rim of a cap 20 which is pushed into place thereon when the dispenser is not in use. If desired, the projecting peripheral surface of the closure element 15 may be given a knurled or other roughened finish to assist in gripping it with the fingers and in retaining the cap in position.

Apart from the cap and the outer container, the form of dispenser just described comprises only three parts, all of which can easily be moulded from plastic material, so that the whole dispenser can be cheaply manufactured.

The dispenser 21 shown in FIGURE 3 includes cylindrical member 22 provided with inner screw threads. The lower edges of the cylinder 22 are provided with a circumferential bead 23. A plunger 24 having the shape of a circular disc is provided upon its periphery with screw threads which engage the internal screw threads of the cylinder 22. The upper portion of the cylinder 22 has the shape of a closure disc 25 provided with a central hole 26. The dispenser has a separate rotary bottom 27 having a circumferential groove 28 receiving the bead 23. The bottom 27 carries two rods 29 and 30 which are firmly connected therewith and which extend through holes provided in the plunger 24 located on opposite sides of the central hole 26. The disc 25 is covered by a cap 31.

The dispenser 21 is used in the same manner as the one previously described, namely, a relative rotation of the cylinder 22 and of the bottom 27 will provide an up or down movement of the plunger 24. A movement of the plunger 24 toward the closure disc 25 will force a quantity of the substance carried by the container through the central hole 26.

The described dispensers may constitute complete units filled with the substance to be dispensed and sold as such to the consumer; on the other hand, these dispensers may serve as inserts fitting into larger containers, such as the container 32. These and other variations and modifications of the present invention are to be included within the scope of the present invention.

What is claimed is:

1. A dispenser, comprising a cylindrical member having inner screw threads, a closed bottom and an open top, a closure member closing the top of the cylindrical member and rotatable relatively thereto, said cylindrical member and said closure member having inter-engaging portions consisting of a circumferential groove and a bead fitting into said groove, a piston located within said cylindrical member and having circumferential screw threads meshing with the inner screw threads of the cylindrical member, said closure member having a central dispensing opening, and a plurality of rods firmly carried by said closure member and spaced from said central opening, said rods extending through openings formed in said piston, whereby relative rotation of said cylindrical member and said closure member will cause said piston to turn and move upon said inner screw threads, whereby movement of said piston in one direction may force a substance through said central opening.

2. A dispenser, comprising a cylindrical member having inner screw threads, a closed top and an open bottom, a closure member closing the bottom of the cylindrical member and rotatable relatively thereto, said cylindrical member and said closure member having inter-engaging portions consisting of a circumferential groove and a bead fitting into said groove, a piston located within said cylindrical member and having circumferential screw threads meshing with the inner screw threads of the cylindrical member, the top of said cylindrical member having a central dispensing opening, and a plurality of rods firmly carried by said closure member and spaced from said central opening, said rods extending through openings formed in said piston, whereby relative rotation of said cylindrical member and said closure member will cause said piston to turn and move upon said inner screw threads, whereby movement of said piston in one direction may force a substance through said central opening.

References Cited by the Examiner

UNITED STATES PATENTS

| 1,170,089 | 2/1916 | Milne. | |
| 1,498,439 | 6/1924 | Flom | 222—390 |
| 1,657,273 | 1/1928 | Nymann | 222—390 X |
| 2,328,973 | 9/1943 | Goldfisher | 222—390 X |

LOUIS J. DEMBO, *Primary Examiner.*